No. 730,909. PATENTED JUNE 16, 1903.
J. H. GROSS.
RURAL ROUTE MAIL CONVEYANCE.
APPLICATION FILED MAR. 27, 1903.
NO MODEL.

Witnesses.
Fay Graham
Ira C. Graham.

Inventor.
Jacob H. Gross.
by L. P. Graham
his attorney.

No. 730,909. Patented June 16, 1903.

UNITED STATES PATENT OFFICE.

JACOB H. GROSS, OF NIANTIC, ILLINOIS.

RURAL-ROUTE MAIL CONVEYANCE.

SPECIFICATION forming part of Letters Patent No. 730,909, dated June 16, 1903.

Application filed March 27, 1903. Serial No. 149,871. (No model.)

*To all whom it may concern:*

Be it known that I, JACOB H. GROSS, of the town of Niantic, in the county of Macon and State of Illinois, have invented a certain new and useful Rural-Route Mail Conveyance, of which the following is a specification.

This invention provides a vehicle that may be drawn over very muddy roads, and it is particularly applicable to the use of rural-route mail-carriers.

The invention is exemplified in the structure hereinafter described, and it is defined in the appended claim.

Figure 1:
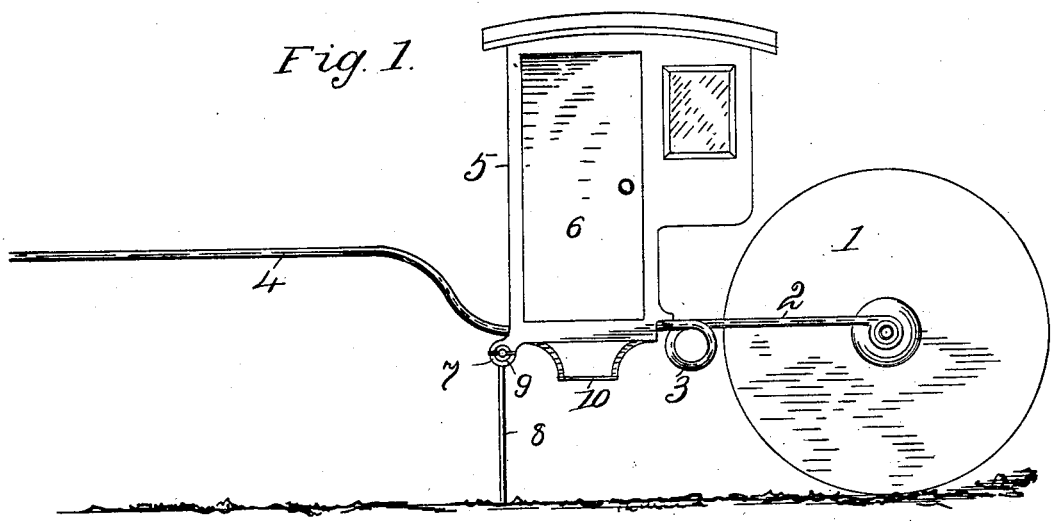
Figure 2:
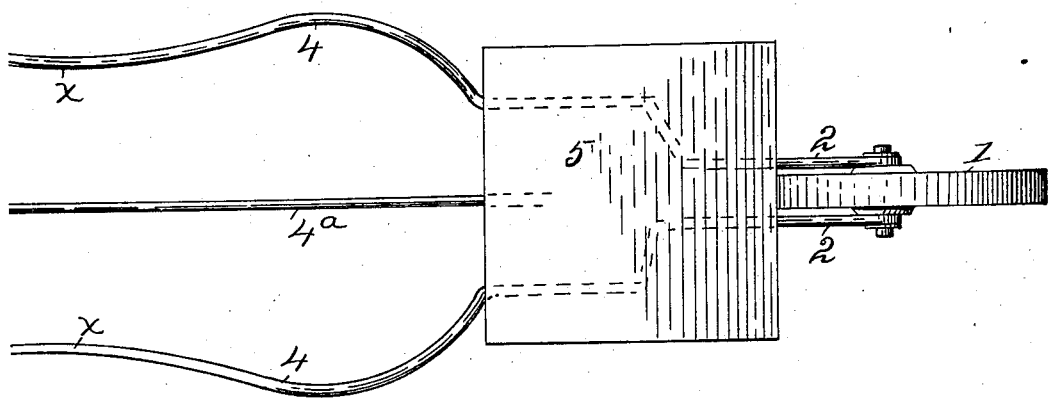

In the drawings forming part of this specification, Figure 1 is an elevation of a vehicle embodying my improvements, and Fig 2 is a plan of the same.

The vehicle is of the wheelbarrow type, carrying a covered box or body and having shafts through which the box is supported and steadied by a horse or horses. The wheel is shown at 1, and it is preferably flat and spokeless to preclude the carrying of excessive quantities of mud. The sustaining-frame comprises a pair of rods, as 2, which extend one on each side of wheel 1 and connect with the journal thereof. The rods 2 are coiled at 3 to form springs. They extend beneath the box or body 5 of the vehicle, and they terminate in shafts 4. The body 5 has a door 6 to admit the driver, and it is preferably provided with a step-plate, as 10. Lugs 7 are formed on the lower front corners of the body of the vehicle, and bolts 9 secure sustaining-rods 8 to the lugs. The sustaining-rods are used to hold the body upright while hitching the horse or horses into the shafts, and afterward they are swung up alongside the body entirely out of the way.

The barrow must have two shafts, and it may be provided with a third one, as shown at 4ª in Fig. 2. The shafts are sustained from the harness at or about the points $x$ in Fig. 2, and when so sustained they will hold the body of the vehicle upright.

Under ordinary circumstances one horse will suffice to sustain and draw the vehicle; but in extreme cases the middle shaft may be employed. Space may be made on each side of the central shaft for a horse, and two horses may be used.

The single wheel may be readily drawn wherever a horse can walk. The springs 3 provide elasticity where springs are needed, and the vehicle may be built at a comparatively small cost.

The vehicle may be drawn through any of the well-known team-hitches. As these do not form any part of my invention and as they may be made in various ways, they are not shown.

It is obvious that the form, proportion, and details of construction may be varied considerably without departing from the principle of my invention.

I claim—

In a vehicle, the combination of a body, a wheel in the rear of the body and shafts secured stiffly to the front of the body, coils in the rods to form springs and a wheel journaled between the rods.

In testimony whereof I sign my name in the presence of two subscribing witnesses.

JACOB H. GROSS.

Witnesses:
JOHN E. ABEL,
JENNIE CORBETT.